Inventor:
Stefan Maslowski

United States Patent Office 3,666,345
Patented May 30, 1972

3,666,345
COUPLING DEVICE IN MODULATED COHERENT LIGHT TRANSMISSION SYSTEM
Stefan Maslowski, Aufheim, Neu-Ulm, Germany, assignor to Licentia Patent-Verwaltungs-G.m.b.H., Frankfurt am Main, Germany
Filed Sept. 15, 1970, Ser. No. 72,448
Claims priority, application Germany, Sept. 20, 1969, P 19 47 719.1
Int. Cl. G02b 27/00
U.S. Cl. 350—3.5
17 Claims

ABSTRACT OF THE DISCLOSURE

For coupling two optical devices together in series for the transmission of a coherent, modulated light beam, a hologram is formed by the interference of a coherent wave with the light produced by transmitting the same coherent wave in the reverse direction through the optical device to which the light beam is to be transmitted and such hologram is placed between the two optical devices which are to be coupled.

BACKGROUND OF THE INVENTION

The present invention relates to an optical coupling arrangement for transmitting a data modulated light beam from an optical output device to an optical relay device whose geometrical configuration is such that only a small number of light modes can propagate therein, such a relay device particularly being a light-conductive fiber.

The level of efficiency of an optical data transmission system depends to a particular extent on the level to which it is possible to reduce the losses in the system, the largest component of which is the losses which generally occur at the coupling between two optical devices, e.g. a laser and a light-conductive fiber or two light-conductive fibers.

It is known to construct such couplings with the aid of lens arrangements. In addition to the difficulty of focusing a light beam with the required accuracy down to the core diameter of a light-conductive fiber in which only a few light modes can propagate, lens arrangements produce erroneous matchings which are caused by the characteristic field distribution of the modes in the fiber.

SUMMARY OF THE INVENTION

It is the object of the present invention to avoid the above drawbacks and difficulties and to provide an arrangement with which it is possible to couple two optical devices while achieving all optimum mode matching.

This is accomplished, according to the present invention, by disposing at least one hologram between the optical devices, the hologram having an interference pattern which is produced by two superposed waves, the first of which contains the types of modes which can propagate in the receiving optical device and the second of which is a reference wave which meets the hologram coherence requirements. The basic principles of holographic recording and reproduction are now well known and are described, for example, in the 1966 edition of the McGraw-Hill Yearbook of Science and Technology, pages 227–229.

DESCRIPTION OF THE PREFERRED EMBODIMENTS

Figure 1:
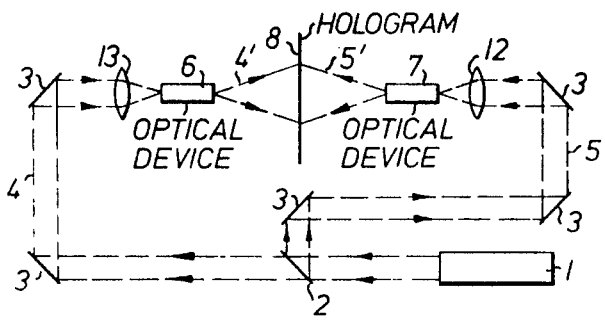
FIG. 1 is a schematic light path diagram illustrating the production of a hologram for use in a device according to the present invention.
Figure 2:
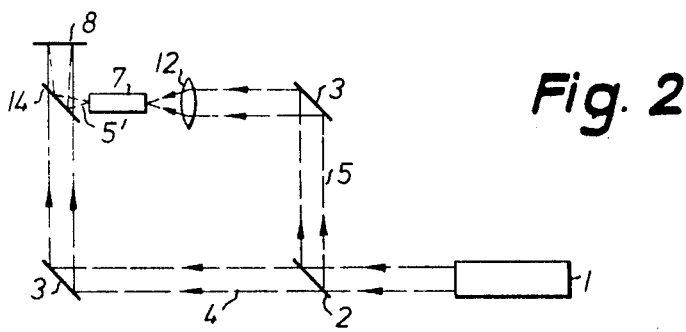
FIG. 2 is a similar schematic light path diagram illustrating the production of a hologram.

FIG. 1 shows an arrangement for recording a hologram of the type employed in the practice of the invention. The diffraction limited radiation from a laser 1 is divided by a beam divider 2 into two coherent individual beams 4 and 5. The two beams 4 and 5 are directed via mirrors 3 to lenses 12 and 13 and launched into the optical devices 6 and 7. Then the beams 4 and 5 are guided by the optical devices 6 and 7 and emitted as radiation lobes 4' and 5' onto a light-sensitive layer 8. There, a hologram is produced from the interference of the waves emitted in the directions of the arrows, which hologram contains the characteristic features of the field distribution occurring in the two optical devices, or in their end portions. The two waves can be understood to be the object wave 5' and the reference wave 4' as those terms are employed in holography. By omitting optical device 6 and lens 13, the coherent beam 4 can be used as a plane reference wave. It may be advantageous if the layer 8 is struck by the beams not from respective sides but only from one side. This may be accomplished—as shown in FIG. 2—with the aid of a beam divider 14. In the arrangement according to FIG. 2 the diffraction limited beam from the laser 1 again is split into two coherent individual beams 4 and 5. The beam 5 is directed via a mirror 3 to the lens 12, launched into the optical device 7, and the radiation lobe 5' is directed by a beam divider 14 to the light-sensitive layer 8. The beam 4 is directed by a mirror 3 through the beam divider 14 to the layer 8, too, where it acts as a plane reference wave. By inserting lens 13 and optical device 6 into beam 4 between mirror 3 and beam divider 14 the hologram on layer 8 is formed by two diverging waves 4' and 5' as in the arrangement according to FIG. 1.

Figure 3:
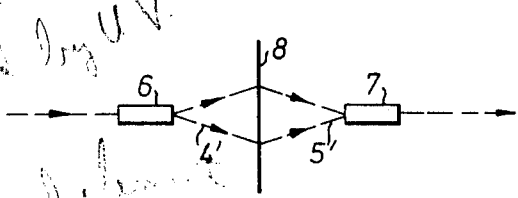
FIG. 3 is a diagram similar to that of FIG. 1 illustrating the arrangment of such hologram in a transmission system according to the invention.

In the transmission from such an element 6 to element 7, as shown in FIG. 3, of a light beam which has been modulated with data, such a hologram 8 made by the divergent radiation lobes 4' and 5' of the devices 6 and 7 can act as a specific adaptor lens or a modified Fresnel zone plate which is adapted particularly to the optical devices to be coupled. The light wave 4' from device 6 acts as a reference wave and the diffraction of wave 4' when passing through the hologram 8 produces a reconstruction of the wave 5' which existed during recording in the region between the device 7 and the hologram. Thus an optimum mode adaption is assured during coupling to the device 7.

Figure 4A:
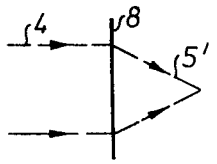
FIG. 4a is a light path, showing the conversion of a plane wave into a convergent wave by a hologram.
Figure 4B:
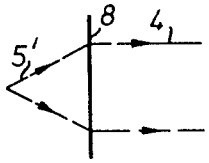
FIG. 4b is a light path, showing the conversion of a divergent wave into a plane wave by a hologram.

If the hologram 8 was generated by a divergent wave 5' of optical device 7 and by the plane reference wave 4 the following reconstructions with this hologram can be accomplished. As shown in FIG. 4a an irradiation with a plane wave 4 delivers a convergent wave identical with 5' but travelling in the opposite direction, and as shown in FIG. 4b an irradiation with a divergent wave identical to 5' delivers a plane reconstructed wave 4.

The recording of such a hologram can be accomplished in a known manner by forming interference structures in which the light absorption of the layer is varied, thus producing an amplitude modulation of the light passing therethrough. In addition, layers are known whose index of refraction can be varied to modulate the phase of the light.

Alignment problems occur when such a hologram is developed and fixed in the usual manner and is later to be reinserted between the optical devices. These problems can be avoided if a material is employed for this purpose which can be left in the same position for initial exposure and further development treatment. Such a possible material is, for example, a photomaterial whose light-sensitive layer can be polymerized at each point by laser beams and fixed by ultraviolet light. Such a photopolymer material is disclosed by D. H. Close, A. D. Jacobson, J. D. Margerum, R. G. Brandt and F. J. McClung in "Hologram Recording on Photopolymer Materials" in Applied Physics Letters, vol. 14, No. 5 (1969), pages 159–160.

Figure 5:
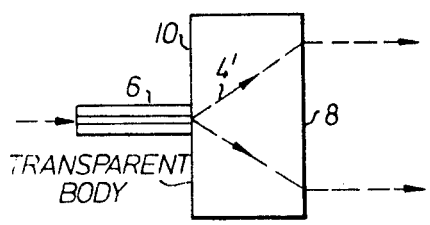
FIG. 5 is a view similar to that of FIG. 1 of another embodiment of the invention.

The coupling problems can also be substantially reduced by the incorporation of coupling members or a plurality of holograms. As shown in FIG. 5, for example, a coupling member can be designed as a transparent body 10 which is permanently connected between one of the optical devices, for example 6 and the hologram 8, the hologram being generated by the radiation lobe 4' of optical device 6 and a plane wave. As pointed out in this way the radiation lobe 4' is transformed by reconstruction of the hologram into a plane wave.

Figure 6:
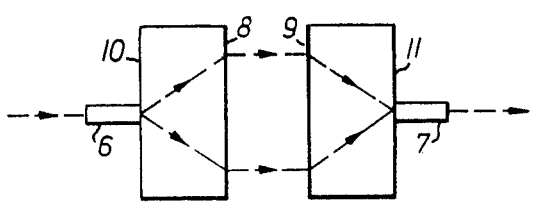
FIG. 6 is a view similar to that of FIG. 1 of yet another embodiment of the invention.

A particularly advantageous embodiment of the present invention employing two holograms and respective coupling members according to FIG. 5 is shown in FIG. 6. Each hologram is produced by means of a wave composed of light from the device to be matched and a reference plane wave. The light coming out of the hologram connected with the coupling member of device 6 as a plane wave is launched into device 7 by the hologram and coupling member connected with device 7. Two such arrangements 8, 10 and 9, 11 connected together are distinguished by a substantially uncritical behavior as regards alignment errors since they are coupled together only through a plane wave. In addition to the described waves, other waves, e.g. diverging beams, are also conceivable as reference waves.

For the construction of a tightly branched transmission net it may be necessary, under certain circumstances, to reproduce such holograms in large numbers. Photochemical methods will be the most suitable for such recording, possibly again in conjunction with coupling members. Moreover, it is possible to produce holograms also by means of a printing or deposition process or an etching or removal process.

It will be understood that the above description of the present invention is susceptible to various modifications, changes and adaptions and the same are intended to be comprehended within the meaning and range of equivalents of the appended claims.

Although it is preferred that the axis of the two optical devices are in one line, and the hologram in the space between the two optical devices is arranged in a plane vertical to the aligned axis, it is possible that the plane of the hologram is inclined to a certain extent and that the axis of one optical device is somewhat inclined to the axis of the other optical device.

I claim:

1. A method of coupling together the output end of an optical transmitting device and the input end of an optical receiving device having a bilateral transmission characteristic and capable of propagating only a small number of light modes in a system for transmitting a data modulated coherent light beam, comprising the steps of: transmitting such a coherent beam through the transmitting device in its normal light transmitting direction and through the receiving device in the direction opposite to its normal transmitting direction; applying the light waves emerging from the two devices to a photosensitive layer to form a hologram of the interference pattern therebetween; and disposing the resulting hologram between said devices to constitute a component in the path of transmission of such coherent light from the transmitting device to the receiving device in the normal operation of the system.

2. An optical coupling arrangement for transmitting a data modulated light beam from an optical output device to an optical relay device in which, due to its geometric configuration, only a small number of light modes can propagate, said arrangement comprising hologram means disposed between said optical devices and containing the interference pattern of two superposed waves, the first of which waves presenting the light mode types which are capable of propagating in said relay device and the second of which waves being a coherent reference wave.

3. An arrangement as defined in claim 2 wherein the reference wave contains those light mode types which can propagate in said output device.

4. An arrangement as defined in claim 2 wherein the reference wave is a substantially plane wave.

5. An arrangement as defined in claim 2 wherein the reference wave is a diverging beam.

6. An arrangement as defined in claim 2 wherein the light for producing the waves is provided by a laser.

7. An arrangement as defined in claim 2 wherein the hologram is recorded by applying the first wave in a direction opposite that of a modulated light beam between said optical output and relay devices.

8. An arrangement as defined in claim 2 wherein the interference pattern is recorded by applying the two waves from respectively different sides.

9. An arrangement as defined in claim 2 wherein the interference pattern is recorded by applying both waves from one side of the hologram by means of a beam divider.

10. An arrangement as defined in claim 2 wherein the interference pattern is an amplitude-modulated recording.

11. An arrangement as defined in claim 2 wherein the interference pattern is a phase-modulated recording.

12. An arrangement as defined in claim 2 wherein said optical output device is a laser.

13. An arrangement as defined in claim 2 wherein said hologram is permanently mounted with respect to at least one of said optical devices.

14. An arrangement as defined in claim 13, further comprising a coupling member for rigidly joining said hologram to said one device.

15. An arrangement as defined in claim 14 wherein the hologram is photographically fixed in situ during the recording operation.

16. An arrangement as defined in claim 15 wherein the hologram is photographically fixed after the action of the recording beams by ultraviolet radiation.

17. An arrangement as defined in claim 2 wherein said hologram means comprise: a first hologram rigidly permanently joined to said optical output device prior to being recorded and presenting the interference pattern between a wave presenting the light mode types capable of propagating in said optical output device and a substantially plane coherent wave; and a second hologram rigidly permanently joined to said optical relay device prior to being recorded and presenting the interference pattern between a wave presenting the light mode types capable of propagating in said optical relay device and a substantially plane coherent wave; whereby light from said output device passes between said holograms as a substantially coherent plane wave.

References Cited

UNITED STATES PATENTS 3,508,807  4/1970  Mayer ............ 350— 96 B

OTHER REFERENCES

Hioki et al., Japan J. Appl. Phys. 817 (1965).
Sincerbox, IBM Tech. Disc. Bulletin 267–8 (August 1967).
Casler et al., Applied Physics Letters 341–2 (June 1967).

DAVID SCHONBERG, Primary Examiner

R. L. SHERMAN, Assistant Examiner

U.S. Cl. X.R.

350—96 B